United States Patent [19]

Johnston

[11] 4,033,367
[45] July 5, 1977

[54] TENT APPARATUS FOR FUMIGATION OF BUILDINGS

[76] Inventor: Taylor C. Johnston, 3745 S. Lake Drive, Miami, Fla. 33155

[22] Filed: Dec. 4, 1975

[21] Appl. No.: 637,521

[52] U.S. Cl. .................................. 135/8; 4/172.12; 47/20; 135/15 CF; 135/DIG. 8

[51] Int. Cl.$^2$ ...................... A45F 1/12; A01G 13/02

[58] Field of Search ............ 135/8, 15 CF, DIG. 5, 135/DIG. 8; 21/109; 47/20, 21, 22; 43/124, 125; 4/172.12

[56] References Cited

UNITED STATES PATENTS

| | | | |
|---|---|---|---|
| 734,311 | 7/1903 | Ferroussat | 135/8 X |
| 1,322,149 | 11/1919 | Swain | 135/8 |
| 1,518,434 | 12/1924 | Klein | 47/21 X |
| 1,581,331 | 4/1926 | Smith | 135/15 CF |
| 1,600,749 | 9/1926 | Barnes | 47/21 |
| 1,820,040 | 8/1931 | Zuckerman | 47/22 |
| 1,834,084 | 12/1931 | Barnes | 47/21 |
| 2,420,706 | 5/1947 | Haven et al. | 135/15 CF |
| 3,443,265 | 5/1969 | Hauck | 4/172.12 |
| 3,534,412 | 10/1970 | Crook | 4/172.12 |
| 3,667,070 | 6/1972 | Pitti et al. | 4/172.12 |
| 3,747,131 | 7/1973 | Koliomichalis | 4/172.12 |
| 3,769,763 | 11/1973 | Kwake | 52/2 |

Primary Examiner—Thomas F. Callaghan
Assistant Examiner—Conrad L. Berman
Attorney, Agent, or Firm—Oltman and Flynn

[57] ABSTRACT

Tent fumigation apparatus is disclosed for placement over a building to allow fumigation of the building by introducing fumigating gas into the tent. The preferred tent includes pie-shaped sections, at least some of which have ties allowing sections to be tied off for reducing the size of the tent and conforming it to the shape of the building. Tube means is provided to be affixed to the bottom of the tent for sealing purposes. The tent may include a lifting structure at the top and a cover for closing an opening at the lifting structure. At least one slot is provided in the tent for entrance and egress.

2 Claims, 11 Drawing Figures

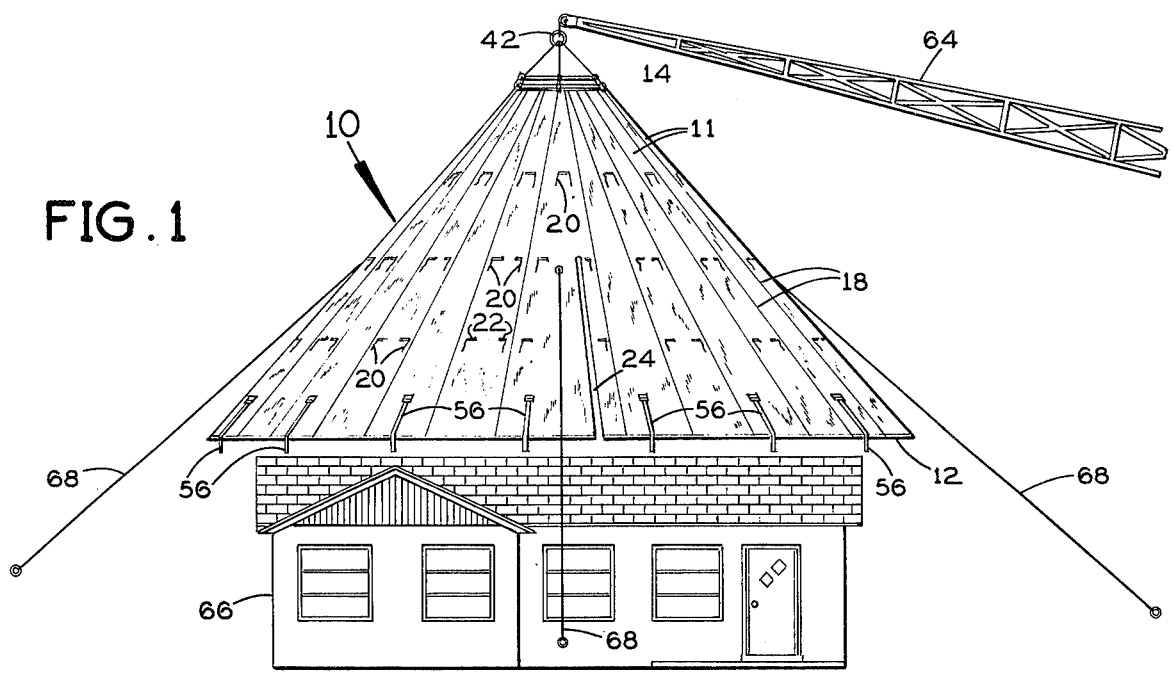
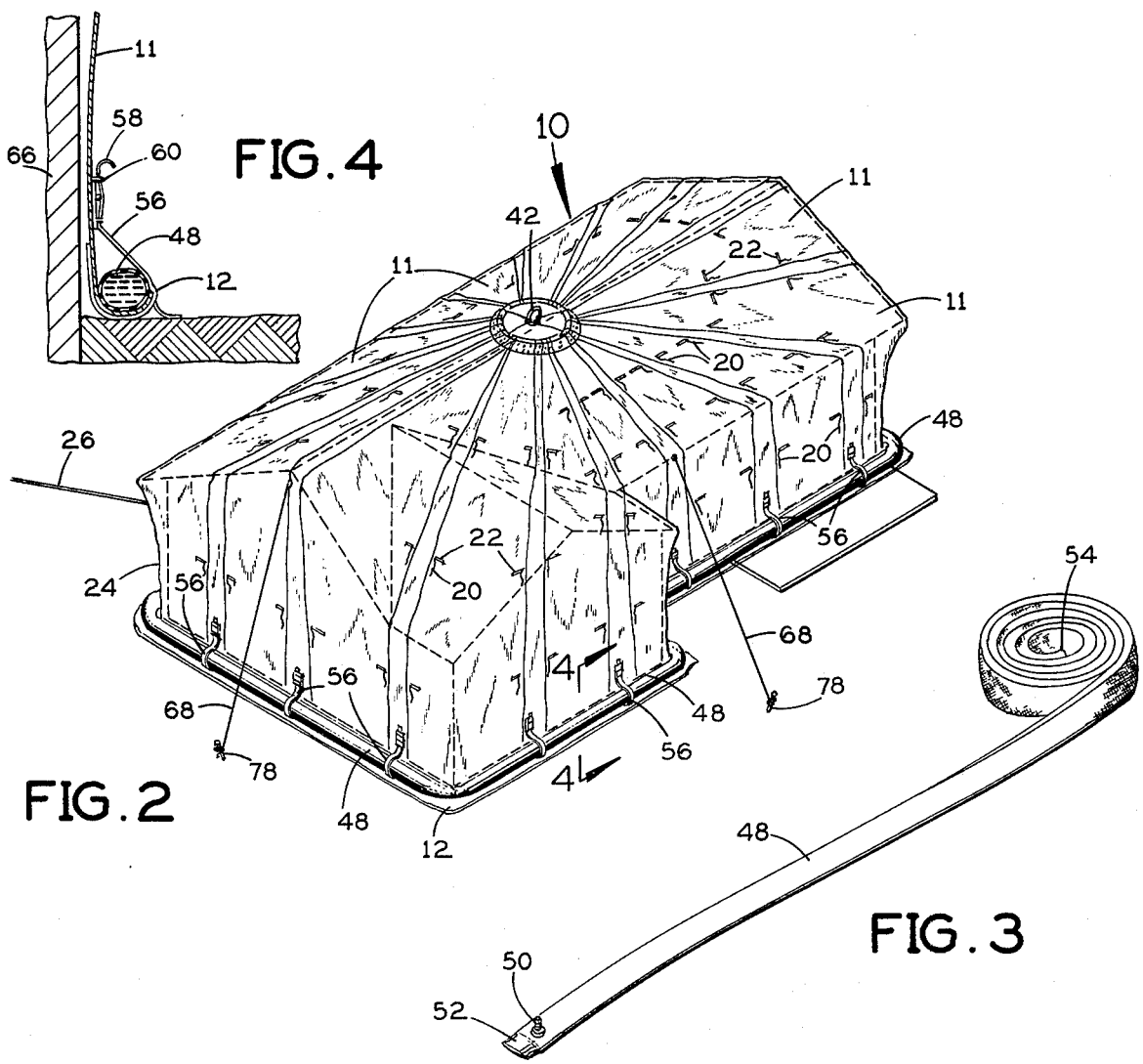

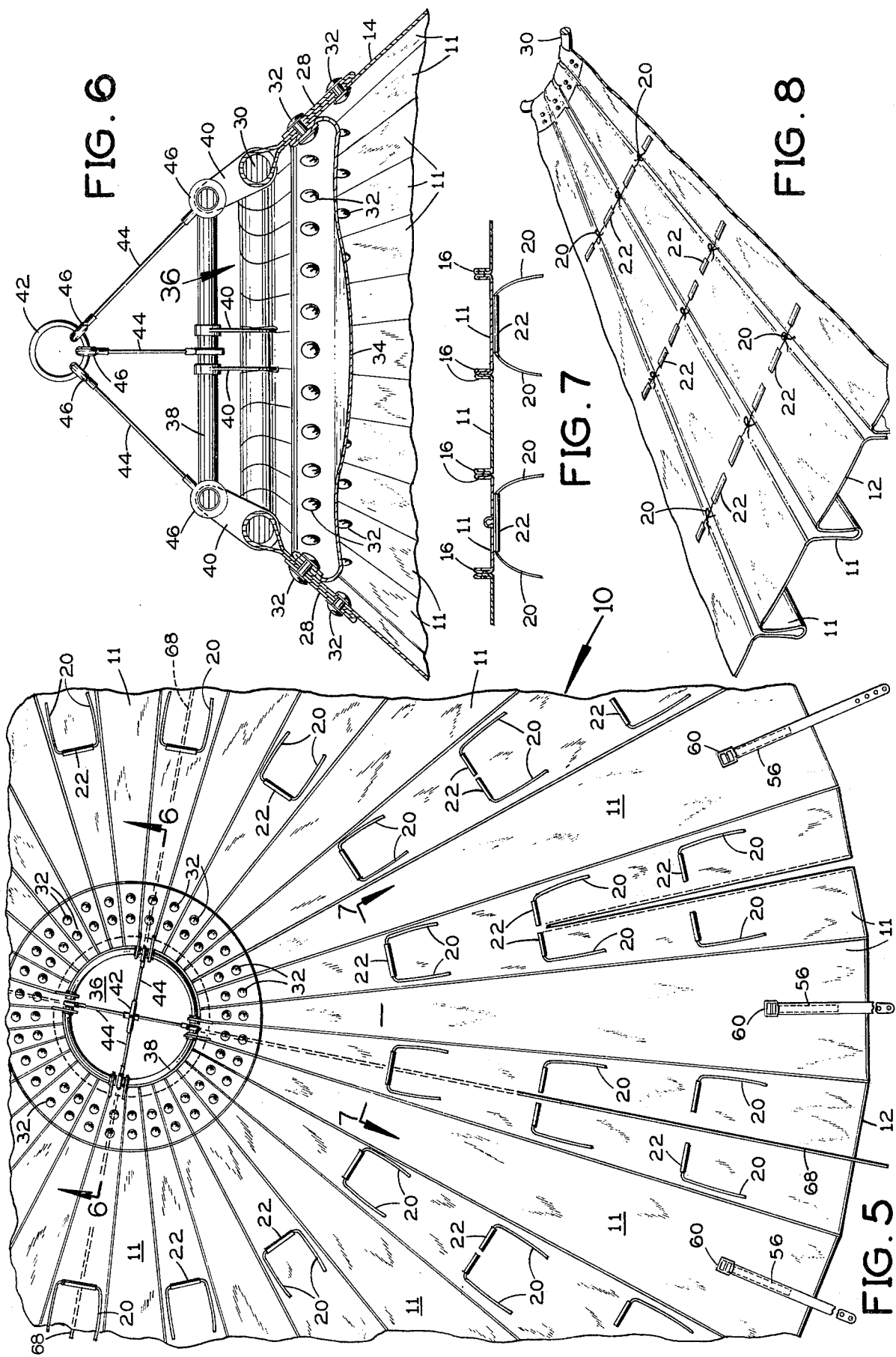

TENT APPARATUS FOR FUMIGATION OF BUILDINGS

BACKGROUND OF THE INVENTION

Certain covering devices have included tubes for holding down the edges of the cover. For example see U.S. Pat. Nos. 3,711,873; 3,732,581; 3,747,131; 3,533,110. However, there has been a need for a tent which could be held down and inflated with gas for the purpose of fumigating buildings. It would be advantageous if such a tent could be lifted and lowered over a building, evacuated and conformed to the shape of the building.

SUMMARY OF THE INVENTION

The present invention provides tent apparatus including ties for adjusting its shape; fillable, weighted tube means for holding down the bottom edge of the tent; at least one slot for entrance and egress; and lifting structure at the top. A cover closes an opening at the lifting structure. The tent can be lifted from the top and placed over a building to be fumigated as with a crane. Sections of the tent are folded and tied off to adjust the shape of the tent to the building. The bottom of the tent is made relatively gas tight by the use of the tube structure which may be a water-filled hose or sand-filled bags. The top of the tent is sealed and the seams are of a relatively gas-tight construction. In operation, a vacuum pump is used to reduce the pressure inside of the tent, thus collapsing it around the building. Then fumigating gas is introduced into the tent and the building and is allowed to stay until fumigation is complete.

It is an object of the invention to provide an improved tent apparatus for fumigation purposes.

Another object of the invention is to make it possible to adjust the shape of the tent.

A further object is to seal the tent so that air can be pumped out of the tent and fumigating gas can be introduced into the tent without too much leakage.

Still another object is to provide lifting structure on the tent.

Among the other objects of the invention are to make the tent simple to construct, easy to use, durable, and relatively gas tight.

Further objects and advantages of this invention will be apparent from the following detailed description of a presently-preferred embodiment thereof, which is shown in the accompanying drawings, in which:

FIG. 1 is an elevational view showing a tent being placed over a building;

FIG. 2 is a perspective view showing the tent enclosing the building;

FIG. 3 is a perspective view of a hose included in FIG. 2 for sealing the bottom of the tent;

FIG. 4 is a sectional view taken along line 4—4 of FIG. 2 showing the hose of FIG. 3 filled with water and holding down the bottom edge of the tent;

FIG. 5 is a fragmentary top plan view of the tent;

FIG. 6 is a sectional view taken along line 6—6 of FIG. 5 and showing the lifting apparatus and a sealing cover at the top of the tent;

FIG. 7 is a sectional view taken along line 7—7 of FIG. 5 showing a portion of the tent including seams and ties;

FIG. 8 is a fragmentary perspective view of a portion of the tent showing certain sections of the tent folded up and tied off with the ties;

Figure 9:
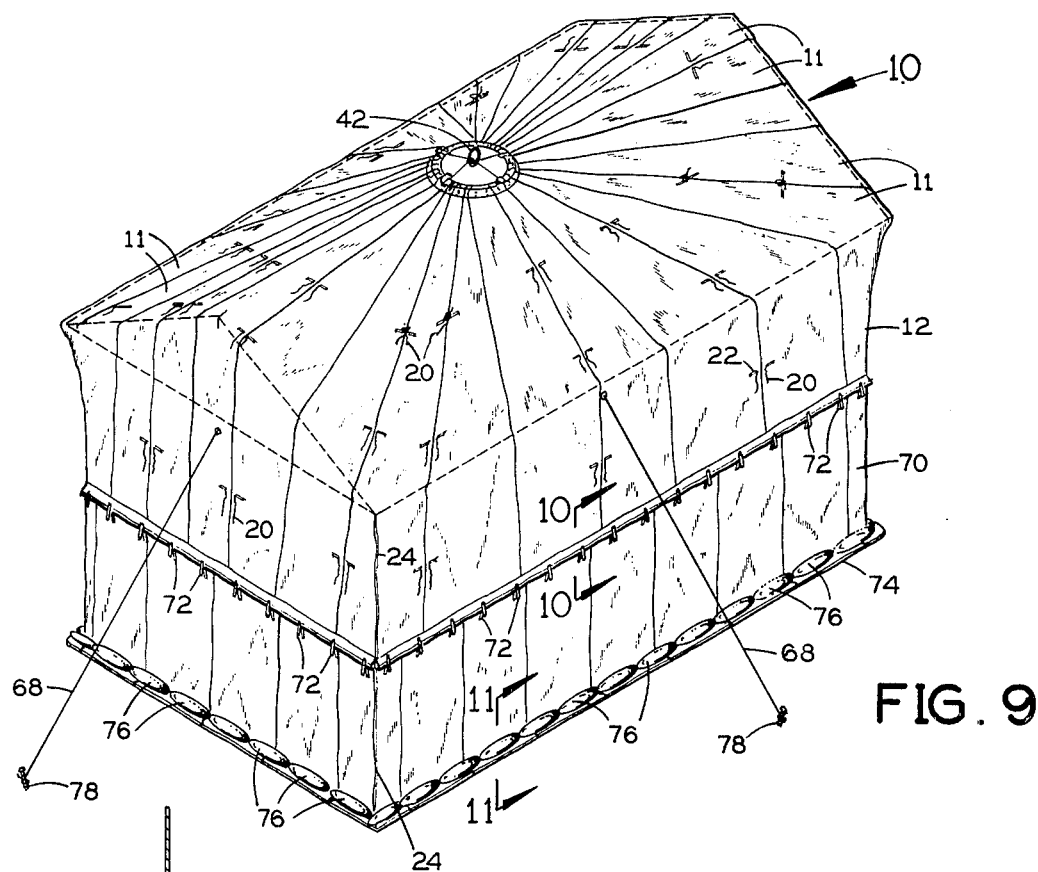
FIG. 9 is a perspective view of a second embodiment of the invention as it appears when placed over a two-story building and shows material draped from the bottom of the tent and held down with sand-filled bags.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Referring first to FIGS. 1-8, the tent 10 is made of gas tight canvas or other suitable material. It includes a plurarality of pie-shaped sections 11 which are wider at the bottom edge 12 than at the top edge 14. Adjacent pairs of the sections 11 are sewn together at their longitudinal side edges 16 in the manner shown in FIG. 7. By folding over the longitudinal side edges 16 and sewing adjacent edges together as shown in FIG. 7, the seams 18 of the tent (FIG. 1) are made relatively gas tight.

Selected pie-shaped sections 11 have ties 20 affixed to them as with straps 22 (FIG. 7). Straps and buckles are an alternative form of tie means. The sections 11 between adjacent ties 20 (FIG. 8) can be folded and tied off by tying adjacent tie strings together. By tying off such selected sections 11, the circumferential size and shape of the tent can be adjusted. This is quite advantageous when the tent is placed over a building of irregular shape in the manner shown in FIGS. 1 and 2 since the tent can be made to conform better to the shape of the building.

The tent has at least one slot 24 in one of the sections 11 which serves as an entrance and exit for the tent. A slot 24 is located at the left in FIG. 2 and an electric service line 26 enters the tent at this slot.

The top of the tent is shown in FIGS. 5 and 6. The top edge 14 of the tent is bent over as at 28 and looped around a metal ring 30. The bent over portion 28 is fastened to the main top edge portion 14 with grommets 32 or other suitable fasteners. Also fastened to the top edge 14 by means of the grommets 32 is a canvas cover 34 which seals the opening 36 within the metal ring 30, thus making the top of the tent gas tight.

A lifting ring 38 is attached to the ring 30 by straps 40 whose ends encircle both of the rings 30 and 38. Ring 38 is spaced parallel to and above ring 30. A third ring 42 is connected to the ring 38 by cables 44. Ring 42 is perpendicular to rings 30 and 38. The cables 44 have loops 46 at their ends for affixing them to the rings 42 and 38.

Referring to FIGS. 2, 3 and 4, the bottom edge 12 of the tent is held down by a water-filled hose 48. Initially, the hose 48 is empty so that it can be manipulated easily when placed on the bottom edge 12 of the tent. After the hose is in place, it is filled with water through a valve inlet 50. The ends 52 and 54 of the hose are sealed off. The hose 48 may be secured to the bottom edge of the tent with straps 56. Each strap 56 is sewn to the bottom edge 12 and can be looped around the hose 48 in the manner shown in FIG. 4. The top end 58 of the strap is fastened to the tent with buckles 60 or other suitable fasteners.

In operation, the tent 10 is lifted with a crane 64 (FIG. 1) in order to position it over the house 66. The hook of the crane is inserted in the ring 42. The sides of the tent are held spread out by means of guidelines 68 which are attached to the outer side of the tent. The guidelines are manipulated by workers. The workers need not scale the building. When the tent is spread out in the manner shown in FIG. 1, it can be lowered over the building to the position shown in FIG. 2. The guidelines 68 are secured with stakes 78, and the crane hook is removed from the ring 42. The hose 48, which is now empty, is placed on the bottom edge 12 and filled with water through the inlet 50. The straps 56 are fastened in the manner shown in FIG. 4.

The inlet of a vacuum pump (not shown) is placed through one of the slots 24. The slot 24 may be positioned such that electric service lines can reach the house through the slot.

Sections 11 of the tent are folded and tied off with the ties 20. The top of the tent is sealed by the cover 34. Since the tent is relatively gas tight, air can be pumped out of it so that is collapses around the house and conforms closely to the house.

Then fumigating gas is pumped in through the slot 24 and the slot 24 is tied off with ties 20. After fumigating is completed, the tent is removed by reversing the steps just described.

Figure 10:
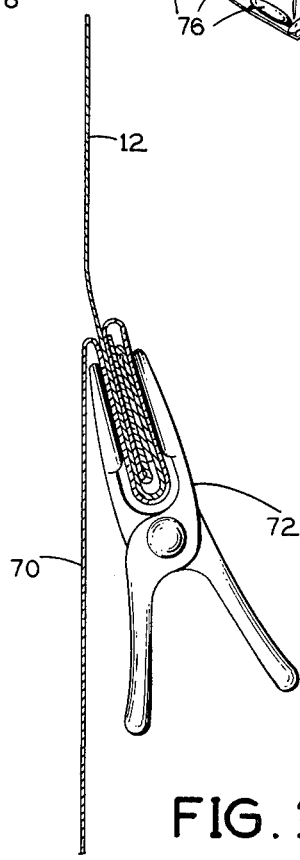
FIG. 10 is a sectional view taken along line 10—10 of FIG. 9 showing the bottom of the tent and material draped therefrom with a clip holding them together.
Figure 11:
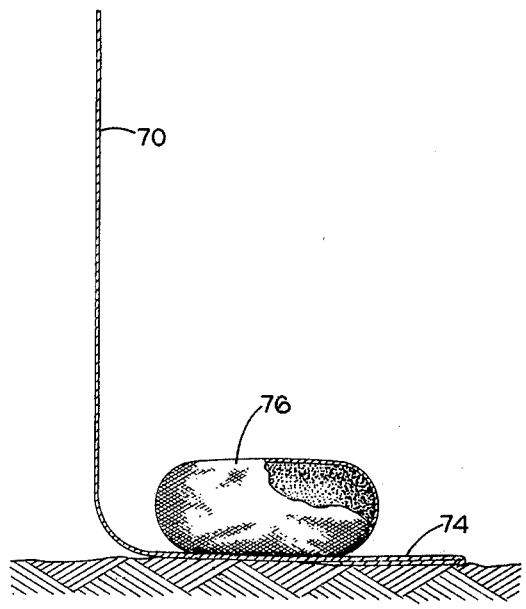
FIG. 11 is another sectional view taken along line 11—11 of FIG. 9 showing a sand-filled bag holding down the bottom edge of the draped material.

A modified embodiment is shown in FIGS. 9-11. Since the modified embodiment is very similar to the embodiment of FIGS. 1-8, the same reference numerals are used for like parts. The tent is identical to the tent 10 of FIG. 1. Additional material 70 is attached to the bottom edge 12 of tent 10 with clips 72 in the manner shown in FIG. 10. Thus, the extended tent can be used to cover a two-story building. The bottom edge 74 of the additional material 70 is held down with sand-filled bags 76 as an alternative to the water-filled hose 48. However, the water-filled hose 48 is preferred.

The tent 10 of FIG. 9 is put in place in accordance with the previous description. The sand-filled bags 76 are put in place on the bottom edge 74. The extended tent is evacuated and filled with fumigating gas in the manner described previously.

Thus the invention provides an improved tent fumigating apparatus which can be easily put in place, folded and tied to conform to the building and collapsed around the building. The tent is relatively gas tight so that fumigating gas does not escape readily.

I claim:

1. In a tent for enclosing a building to be fumigated, said tent having a plurality of adjoining flexible panels of substantially gas-tight material which are elongated and progressively narrower from the bottom to the top of the tent, the improvement wherein:

alternate panels in succession around substantially the entire peripheral extent of the tent each have a plurality of manually connectable ties near each side edge of the panel at intervals along the panel length from bottom to top for the connection of any tie to a correspondingly positioned tie on the near side of the next alternate panel to fold behind them the panel which is between said alternate panels for wrapping the tent relatively closely around discontinuities in the building.

2. A tent according to claim 1, and further comprising:

a first ring at the upper end of said panels, said panels having their respective upper ends looped around said ring;

a cover of substantially gas-tight material attached to the upper ends of said panels and extending across the ring to close the top of the tent thereat;

a lifting ring extending substantially parallel to said first ring on the opposite side of the latter from said panels;

straps connecting said lifting ring to said first ring;

a third ring extending substantially perpendicular to said lifting ring and located centrally of said lifting ring on the opposite side of the latter from said first ring;

and cables connecting said third ring to said lifting ring at intervals around the latter's circumference;

said straps being arranged in pairs on opposite sides of said cables.

* * * * *